(No Model.)
W. BUNTING, Jr.
WATER CLOSET APPARATUS.
No. 474,985. Patented May 17, 1892.
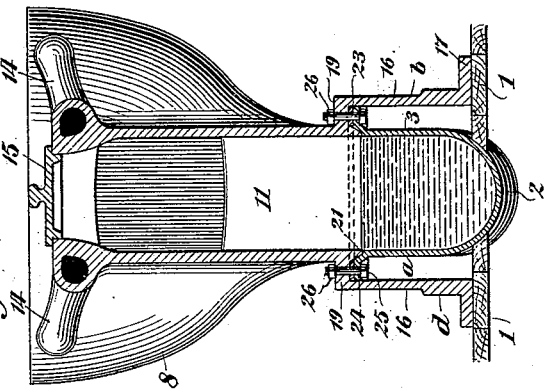
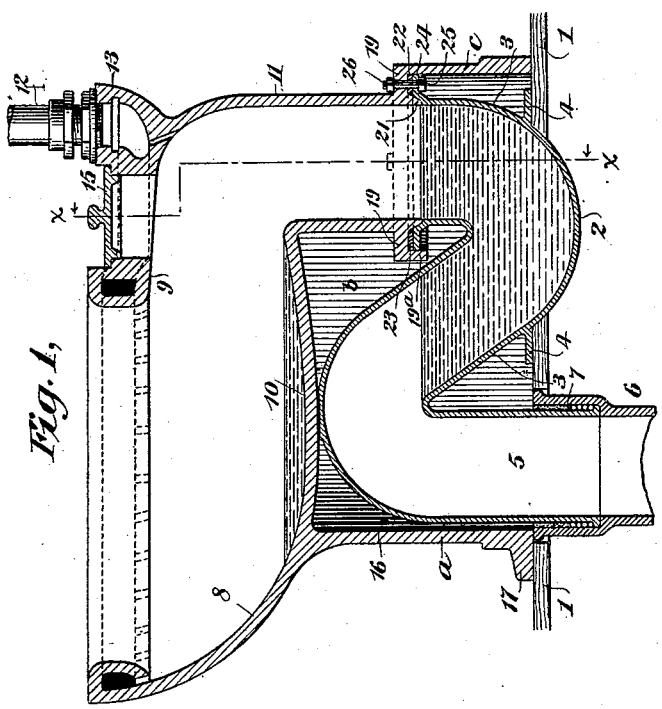
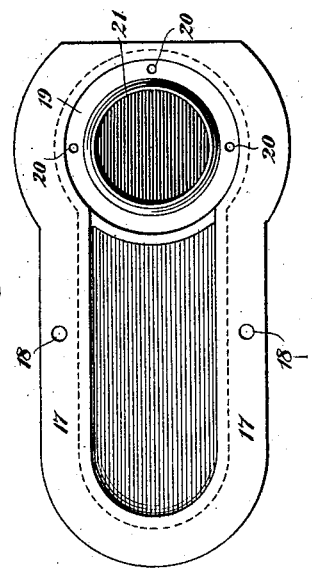
Witnesses
C. E. Ashley
H. W. Lloyd
Inventor
W<sup>m</sup> Bunting Jr.
By his Attorney
Jacob Felbel

UNITED STATES PATENT OFFICE.

WILLIAM BUNTING, JR., OF FLUSHING, ASSIGNOR TO THE MEYER-SNIFFEN COMPANY, LIMITED, OF NEW YORK, N. Y.

WATER-CLOSET APPARATUS.

SPECIFICATION forming part of Letters Patent No. 474,985, dated May 17, 1892.

Application filed January 8, 1892. Serial No. 417,431. (No model.)

*To all whom it may concern:*

Be it known that I, WILLIAM BUNTING, Jr., a citizen of the United States, and a resident of Flushing, in the county of Queens and State of New York, have invented certain new and useful Improvements in Water-Closet Apparatus, of which the following is a specification.

As is well-known, a far better joint at the floor-line can be made between a metal trap and a metal waste-pipe than between an earthenware trap and a metal waste-pipe, and for this reason many earthenware water-closets are made without a trap, but are constructed to be connected to a metal trap after the latter has been attached to the metal waste-pipe by calking, soldering, &c. While this is a very desirable construction and arrangement as far as utility and durability are concerned, the plan is objectionable because the exposed metal trap soon becomes corroded and foul and presents a strong contrast to the clean, highly-polished, and decorated surface of the porcelain or earthenware bowl or hopper. It has been attempted to overcome this objection of appearance by pedestals, but only partial success has been met with, all such efforts having resulted in the creation of a new and more serious objection— namely, the formation of pockets, chambers, or receptacles for the accumulation of dirt and wet, which it is practically impossible for the house-cleaner to remove and which ultimately emit foul odors and render the whole apparatus unsanitary.

My invention has for its main object to entirely conceal the metal trap and to do this in a manner such as to leave no openings or receptacles for the collection of dirt and wet, as in an all-porcelain closet; and it consists in the features of construction and combinations of devices hereinafter more fully described, and particularly pointed out in the appended claims.

In the accompanying drawings, Figure 1 is a central vertical section of a water-closet apparatus embodying my improvements. Fig. 2 is a vertical section through said closet, taken at the line $x\ x$ of Fig. 1. Fig. 3 is a bottom plan view of the water-closet base, the under side of the dish, and the outlet, the metal trap being removed.

In the several views the same part will be found designated by the same numeral or letter of reference.

1 represents the floor of a room or apartment which is cut through for the sinking of the bowl 2 of a metal trap 3, provided with a sustaining-flange 4, which rests upon the floor. The outlet-leg 5 of the trap extends vertically downward and is connected to the upper end of the metal waste-pipe by packing, soldering, calking, &c., as represented at 7, and as well understood by those skilled in the art.

8 represents a water-closet bowl provided with a flushing-rim 9, a dish or receiver 10, and a short outlet or trunk 11 at the rear side thereof. The flushing-rim is supplied with water by a pipe 12, proceeding, as usual, from a tank above and connected to a horn or nozzle 13, which delivers two streams to the flushing-rim through communicating conduits 14 on opposite sides of the bowl. 15 is a ventilating-cover removable to give access to the trunk or outlet and trap in case of clogging, &c.

Formed integral or of a piece with the earthenware bowl 8 and with the outlet or trunk 11 thereof is a hollow stand or pedestal 16, which extends around continuously on all four sides of the closet. The bottom edges of all of the walls or sides $a$, $b$, $c$, and $d$ of the pedestal are carried down to a common base-line, so that when the pedestal is placed upon the floor it may touch the same all around. The base of the pedestal is preferably formed with a flange 17, perforated at suitable places, as at 18, for the passage of fastening bolts or screws. Where the pedestal joins the lower end of the outlet or trunk, a circular horizontal outwardly-projecting flange 19 is formed, which is preferably provided with bolt-holes 20. Below this flange, interiorly, the outlet or trunk is formed with a circular depending neck or extension 21 to form, with walls $b$, $c$, and $d$ and the flange 19 and its vertical lip $19^a$, a recess 22 for a packing-ring 23, and the upper flanged end 24 of the mouth of the trap 3. The horizontal outwardly-extending flange 24 of the trap is preferably formed with perforations to coincide with those in the flange 19, and the packing-ring may likewise be perforated.

In practice the metal trap is first secured to the floor and connected to the waste-pipe in a gas-proof and durable manner. Then bolts or screws 25 are securely fitted in the holes in the flange 24 passing through the holes in the packing-ring, which is laid upon said flange. Then the pedestal (with the closet integral therewith) is fitted over the trap, and in the operation the upwardly-projecting threaded ends of the screws or bolts 25 pass out through the coinciding perforations in the earthenware flange 19 to an extent sufficient to enable them to receive exterior clamping-nuts 26, which are then applied to effect a union between the flanges 19 and 24. By this construction and arrangement it will be observed that the metal trap is hidden entirely from view on every side without leaving any openings for the accumulation of dirt and wet, and that the apparatus as a whole presents the appearance of an all-porcelain closet and trap.

Of course a differently-constructed bowl and flushing means may be employed instead of that herein shown and described, and in some cases, as where the floor is uneven, packing or filling may be placed under the base of the pedestal.

The base-flange of the pedestal may be squared off at the rear side, as shown at Fig. 3, to enable the structure to be set as near the wall of a room as possible.

The holes in the metal-trap flange 24 may be threaded to serve as nuts and the bolts applied downwardly after the pedestal and closet have been placed in position; but I prefer the construction hereinbefore described.

What I claim as new, and desire to secure by Letters Patent, is—

1. In a water-closet apparatus, the combination, with a metal trap having a horizontal outwardly-extending flange, of a bowl, outlet, and hollow pedestal, all made from a single piece of earthenware, the pedestal completely surrounding the said trap on all sides and constructed to form a horizontal outwardly-extending flange at its junction with the outlet, and means for securing together said flanges, substantially as described.

2. In a water-closet apparatus, the combination, with a metal trap having a horizontal outwardly-extending perforated flange, of a bowl, outlet, and hollow pedestal, all made from a single piece of earthenware, the pedestal having four sides, all extending down to a common base-level, so as to completely incase the trap, the outlet having a depending neck at its lower end, and a perforated outwardly-extending flange adjoining the pedestal to form a recess, a packing-ring, bolts or screws projecting upwardly through the flange and packing-ring from the interior of the pedestal, and exteriorly-arranged nuts engaging with the protruding threaded ends of the bolts or screws, substantially as described.

3. A water-closet bowl, outlet, and hollow pedestal, all made from a single piece of earthenware, the walls of the pedestal all extending down to a common base-level, and the pedestal and outlet being constructed to form at their junction a horizontal outwardly-extending perforated flange, substantially as and for the purpose set forth.

Signed at New York city, in the county of New York and State of New York, this 4th day of January, A. D. 1892.

WILLIAM BUNTING, JR.

Witnesses:
IDA MACDONALD,
JACOB FELBEL.